US010628181B2

(12) United States Patent
Wang et al.

(10) Patent No.: US 10,628,181 B2
(45) Date of Patent: Apr. 21, 2020

(54) REDIRECTING MULTIMEDIA OUTPUT OF A VIRTUAL DESKTOP TO A MOBILE DEVICE USING IMAGE SCANNING

(71) Applicant: VMware, Inc., Palo Alto, CA (US)

(72) Inventors: Dong Wang, Beijing (CN); Haiou Jiang, Palo Alto, CA (US); Yunfei San, Beijing (CN); Kun Shi, Beijing (CN); Peng Guo, Beijing (CN)

(73) Assignee: VMware, Inc., Palo Alto, CA (US)

( * ) Notice: Subject to any disclaimer, the term of this patent is extended or adjusted under 35 U.S.C. 154(b) by 138 days.

(21) Appl. No.: 15/653,705

(22) Filed: Jul. 19, 2017

(65) Prior Publication Data

US 2019/0026122 A1    Jan. 24, 2019

(51) Int. Cl.
| G06F 9/451 | (2018.01) |
| G06Q 20/32 | (2012.01) |
| G06F 9/455 | (2018.01) |
| H04L 29/08 | (2006.01) |
| H04W 4/80 | (2018.01) |

(52) U.S. Cl.
CPC .......... *G06F 9/452* (2018.02); *G06F 9/45558* (2013.01); *G06Q 20/322* (2013.01); *G06Q 20/3274* (2013.01); *H04L 67/025* (2013.01); *H04L 67/08* (2013.01); *H04L 67/2814* (2013.01); *H04W 4/80* (2018.02); *G06F 2009/45587* (2013.01); *G06F 2009/45595* (2013.01); *H04L 67/02* (2013.01)

(58) Field of Classification Search
CPC ....................................................... G06F 9/452
See application file for complete search history.

(56) References Cited

U.S. PATENT DOCUMENTS

| 6,801,576 | B1 * | 10/2004 | Haldeman | .......... | H04N 7/17336 |
| | | | | | 348/E7.073 |
| 2010/0313199 | A1 | 12/2010 | Chen | | |
| 2011/0018963 | A1 | 1/2011 | Robinson | | |
| 2012/0326851 | A1 * | 12/2012 | Xu | ........................ | H04L 67/025 |
| | | | | | 340/12.26 |
| 2013/0221083 | A1 | 8/2013 | Doss | | |
| 2013/0225080 | A1 | 8/2013 | Doss | | |
| 2013/0225081 | A1 | 8/2013 | Doss | | |

(Continued)

OTHER PUBLICATIONS

AAPA(applicant admitted prior art).*

*Primary Examiner* — Sisley N Kim (57) ABSTRACT

A system for multimedia redirection where a virtual desktop client device can utilize the multimedia accessories such as digital camera(s) and/or microphone(s) of nearby mobile devices by utilizing image scanning techniques. The mobile device contains a web browser and image scanning technology, such as a QR code reader. The mobile device scans a QR code displayed by the virtual desktop client device and establishes a connection with a web server on the virtual desktop client device. The multimedia stream captured by the multimedia accessories of the mobile device is streamed to the virtual desktop client device using the connection and is redirected by the virtual desktop client device to the virtual desktop. The virtual desktop client device may also redirect multimedia, such as an audio-out stream received from the virtual desktop, to the mobile device in order to playback audio using the speaker of the mobile device.

20 Claims, 6 Drawing Sheets

(56) References Cited

U.S. PATENT DOCUMENTS

| | | | |
|---|---|---|---|
| 2013/0262687 A1* | 10/2013 | Avery | G06F 9/54 |
| | | | 709/229 |
| 2014/0181256 A1* | 6/2014 | Trifa | H04L 67/2814 |
| | | | 709/218 |
| 2014/0304322 A1 | 10/2014 | Dey | |
| 2015/0244812 A1 | 8/2015 | Brunson | |
| 2016/0057135 A1* | 2/2016 | Jiang | H04L 63/0853 |
| | | | 713/172 |
| 2016/0378782 A1 | 12/2016 | Jiang | |
| 2017/0104797 A1* | 4/2017 | Venkatesh | H04L 65/403 |
| 2017/0300189 A1 | 10/2017 | Pendergast | |
| 2017/0351537 A1 | 12/2017 | AbiEzzi | |
| 2018/0220189 A1 | 8/2018 | Hodge | |
| 2019/0026121 A1 | 1/2019 | Wang | |
| 2019/0026122 A1* | 1/2019 | Wang | G06Q 20/3274 |
| 2019/0164165 A1 | 5/2019 | Ithabathula | |

* cited by examiner

REDIRECTING MULTIMEDIA OUTPUT OF A VIRTUAL DESKTOP TO A MOBILE DEVICE USING IMAGE SCANNING

RELATED APPLICATIONS

This application is related to U.S. patent application Ser. No. 15/693,692, entitled "REDIRECTING MULTIMEDIA CAPTURED ON A MOBILE DEVICE TO A VIRTUAL DESKTOP USING IMAGE SCANNING" by Dong Wang et al., filed on the same date as the present application, which is incorporated by reference in its entirety herein.

TECHNICAL FIELD

The present disclosure generally relates to virtual desktop technology, and more specifically relates to enabling a virtual desktop client to access the multimedia capabilities of multimedia-enabled mobile devices.

BACKGROUND

In virtual desktop environments, such as those based on Virtual Desktop Infrastructure (VDI) and Desktop-as-a-Service (DAAS), a user is provisioned with a virtual desktop and allowed to access their virtual desktop over a remote network connection, such as an Internet connection. The virtual desktops are typically hosted on servers that reside in a remotely located data center, and each host server may execute multiple virtual desktops. Users can utilize a client device with a virtual desktop client application installed thereon to remotely log into their individual virtual desktop and all of the application execution takes place on the remote host server which is linked to the client device over the network, using a remote display protocol such as VMware Blast, remote desktop protocol (RDP), PC-over-IP (PCoIP), virtual network computing (VNC), or the like. Using such a remote desktop protocol, the user can interact with applications of the virtual desktop, which are running on the remote host server, such that only the display (i.e., framebuffer pixel data), keyboard, and mouse information is communicated with the local client device. A common implementation of this approach is to host multiple desktop operating system instances on a server hardware platform running a hypervisor.

In some cases, users remotely accessing their virtual desktop need to utilize a multimedia device, such as a camera, microphone or audio speaker. For example, a user may wish to make a Voice Over IP (VOIP) telephone call, join an online meeting or attend a video conference using their virtual desktop. If the user's client device is equipped with a multimedia accessory, the user may utilize Real Time Audio Video (RTAV), which is a feature offered by some virtual desktops. RTAV redirects the multimedia stream captured by the camera and/or microphone of the client device to the remote virtual desktop and makes it accessible to the virtual desktop as though the multimedia accessory was installed on the remote server. RTAV therefore requires the virtual desktop client device to have some form of multimedia capability. However, many client devices capable of establishing a virtual desktop connection may not have built-in multimedia accessories. Moreover, even when the client device is equipped with multimedia accessories, the physical structure of the client device may in some cases make the multimedia capability cumbersome to use, such as in situations where the camera and microphone may need to be moved frequently or rapidly. In these situations, an alternative solution is desirable.

DETAILED DESCRIPTION

Systems and methods in accordance with various embodiments of the present disclosure overcome at least some of the above-mentioned shortcomings and deficiencies by enabling a virtual desktop client device to conveniently utilize the multimedia accessories such as digital camera(s) and/or microphone(s) of nearby mobile devices, such as smart phones, tablets or the like by utilizing image scanning techniques. The multimedia stream captured by those multimedia accessories can be redirected by the virtual desktop client device to the virtual desktop. In some embodiments, the mobile devices do not need to be pre-installed with software specifically programmed to perform this function, so long as the mobile device is capable of running a conventional web browser and image scanning technology, such as Quick Response (QR) code reader or other barcode readers, the multimedia accessories of the mobile device can be easily employed by the virtual desktop client device. In various embodiments, the virtual desktop client device may also redirect a multimedia output stream, such as an audio-out stream, received from the virtual desktop, to the mobile device in order to, for example, playback audio using the speaker of the mobile device.

As used herein, the terms "virtual desktop", "remote desktop" and "desktop" are used interchangeably and refer to an instance of an operating system or application that runs remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user that owns the virtual desktop can remotely log into their virtual desktop using a client device that establishes a network connection (e.g., Wide Area Network connection) with the host server and remotely execute various applications on the virtual machine as if the desktop was running on the user's local client device. The virtual desktop client device can be any computing device capable of establishing a network connection, such as a personal computer (PC), laptop, thin client, smartphone, tablet computer, wearable device (e.g., smart watches, electronic smart glasses, etc.) or the like.

In various embodiments described herein, the virtual desktop client device can employ the multimedia accessory of a nearby mobile device and redirect the multimedia stream captured by the accessory to the virtual desktop. The process can be initiated when a user logged into their virtual desktop client device provides input indicating a request to utilize the multimedia accessory of a nearby mobile device. For example, a user may click on a "Share Camera" button displayed on the virtual desktop or provide the input in some other fashion. Once the user input is received by the virtual desktop client application, a Quick Response (QR) code is generated and displayed to the user by the virtual desktop client device. The QR code is encoded with information (e.g. IP address) identifying a web server that is operating on the virtual desktop client device. The user may then utilize their mobile device equipped with a camera to scan the QR code and establish a connection with the server identified in the QR code. The connection may be a hypertext transfer protocol (HTTP) connection, such as a Web Socket connection, and it is used to send the multimedia stream between the mobile device and the virtual desktop client device.

In one embodiment, when the mobile device is used to scan the QR code, a web application is launched on the web browser of the mobile device. The web application establishes a connection with the server and streams multimedia captured on the mobile device to the virtual desktop client device. For example, the web application may access the digital camera to begin capturing video and stream the captured video to the virtual desktop client device. The virtual desktop client device receives the video over the Web Socket connection and redirects the video to the virtual desktop over a virtual channel by providing the video to a Real Time Audio Video (RTAV) module operating on the virtual desktop client device. In this manner, the video captured by the mobile device is available to the virtual desktop without the need to install specialized virtual desktop client software on the mobile device. The user is therefore allowed to participate in various multimedia based activities, such as online meetings or video conferences even in cases when the virtual desktop client device does not have any multimedia capabilities.

In various embodiments, the virtual desktop client device may also redirect multimedia received from the virtual desktop to the mobile device. This may be useful in applications, such as video conferencing, so that the audio being played on the virtual desktop can be heard directly on the mobile device, without the user having to listen to the audio on the virtual desktop client device. In one embodiment, the server gets the audio-out stream received by the RTAV module from the virtual desktop and streams the audio-out stream to the web application on the mobile device, for playback using the speaker of the mobile device. In the same way, video being played by the virtual desktop can be redirected by the virtual desktop client device to the mobile device, for display on the screen of the mobile device, however it is often advantageous to play the video directly on the virtual desktop client device instead since the screen of devices such as laptops, PCs and thin clients is often substantially larger than screens of mobile devices.

In various embodiments, the multimedia redirection session can be stopped by the user on either the mobile device or the virtual desktop client device. For example, the user may click on an "End Camera Sharing" button displayed on the virtual desktop client (or on the mobile device) and the connection between the web application and the server can be terminated.

Figure 1:
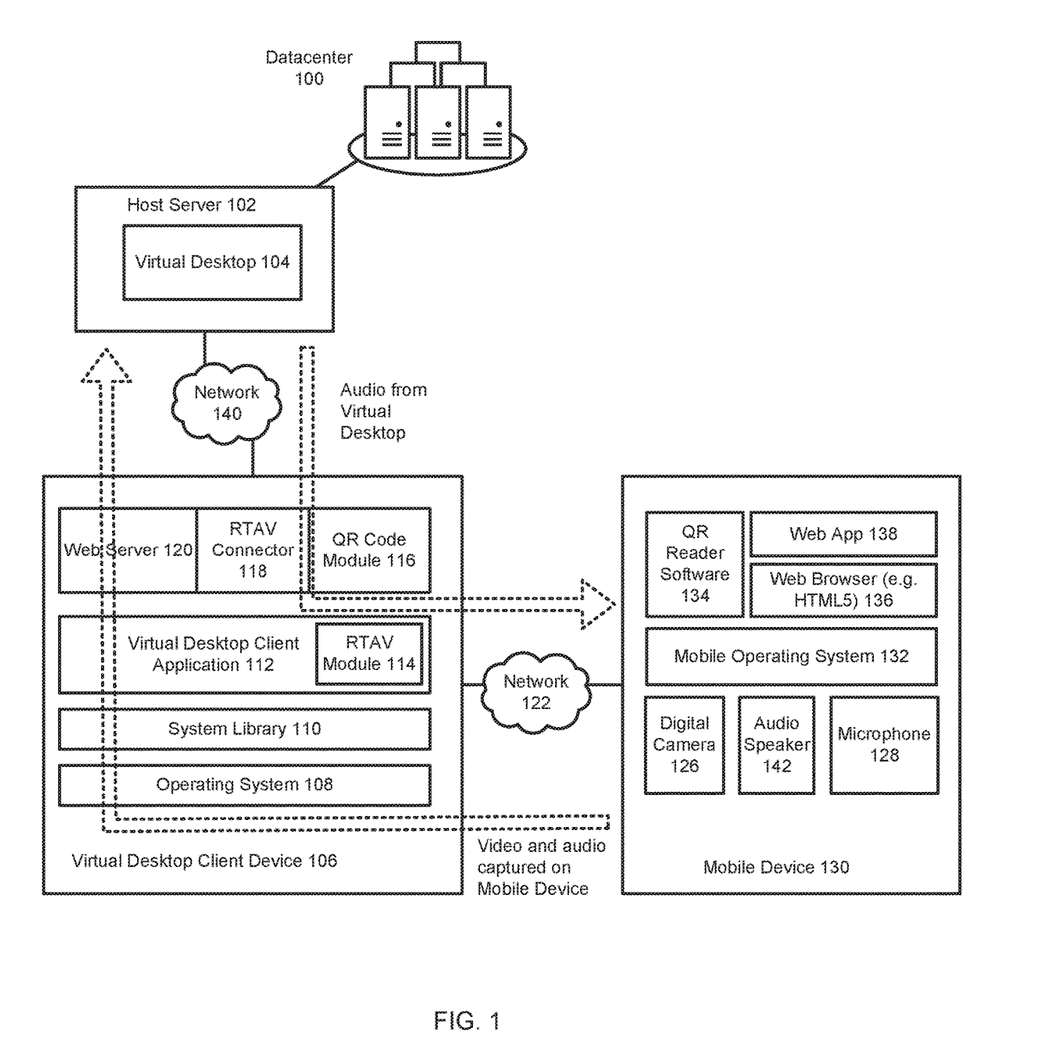
FIG. 1 illustrates an example of a virtual desktop client device redirecting multimedia stream captured on a mobile device to the virtual desktop, in accordance with various embodiments.

FIG. 1 illustrates an example of a virtual desktop client device redirecting multimedia stream captured on a mobile device to the virtual desktop, in accordance with various embodiments. As previously mentioned, the virtual desktop client device 106 may be any computing device capable of executing a virtual desktop client application 112. In the illustrated embodiment, the virtual desktop client device is a computer having an operating system 108 (e.g. Microsoft Windows, Linux, etc.) and a system library 110. A user may start the virtual desktop client application 112 in order to connect to their virtual desktop 104 running on a remote host server 102 using a network connection 140. When the virtual desktop client application 112 starts up, it also sets up an HTTP server 120 which will host the web application 138 used for the multimedia redirection.

When the user wishes to employ the multimedia accessory of the mobile device 130, the user may enter input indicating a request for multimedia redirection. For example, the user may click on the "Share Camera" button displayed by the virtual desktop client application 112 on the client device 106. When such a request is received, the QR code module 116 on the virtual desktop client device 106 generates a QR code having information identifying the web server 120 and displays the QR code on the display screen of the virtual desktop client device 106.

A QR code is a type of well-known and widely available matrix barcode (or two-dimensional barcode) which is often used for product tracking or item identification. The QR code is a machine-readable optical label that contains information about the item to which it is attached. The QR code encodes data into an image which can be read by another machine. In various embodiments described herein, the QR code can be used to transmit data from one device to another. In the illustrated embodiment, the QR code can be displayed on the display screen of a client device 106 (e.g., a PC, laptop, etc.) and be encoded with information that identifies the web server 120 operating on the virtual desktop client device 106.

QR codes can generally be encoded with many different types of information, including information that may be used to redirect the multimedia stream between devices in the embodiments described herein. By way of example, the QR code may be encoded with a unique device identifier (ID), Internet Protocol (IP) address and one-time use token, among other types of information. The QR code is encoded with the information by the virtual desktop client device 106 using a QR code module 116, which can be implemented using any freely available QR code generator software, such as libqrencode. In some embodiments, the QR code module 116 may be integrated and provided to the client device 106 along with the virtual desktop client application 112.

The output of the QR encoder library may be RGB data. To simplify the implementation, a bitmap object can be constructed with the output and a picture of it may be drawn using a set of graphical Application Programming Interfaces (APIs) provided by the operating system. The content encoded in the QR code may be formatted in the following manner: "https://10.112.119.95:8057" where 10.112.119.95 is the IP address of the virtual desktop client device 106 and 8057 is the specified port of the web server 120. In some embodiments, the QR code may also include a one-time use token for security purposes. In these embodiments, besides the server address, the QR code may contain a random string as a token for a session. If a session is successfully set up, the token will expire, i.e. become unavailable for future connections.

Once displayed, the QR code may be scanned using a digital camera 126 of a mobile device 130. For example, the user may start the live camera view of the mobile device 130 and aim the camera 126 of the mobile device 130 at the QR code in order to place the QR code within the field of view (FOV) of the digital camera 126 and to enable the mobile device to scan the QR code. The mobile device 130 may contain QR reader software 134 to scan the QR code and to decode the information encoded therein. One example of such a QR code reader software 134 is ZBar which is a C barcode reading library with C++, Python, Perl, and Ruby bindings.

As previously mentioned, the mobile device 130 may be any device equipped with a multimedia accessory, such as a digital camera 126, audio speaker 142 and/or microphone 128. In some embodiments, the mobile device 130 may be within certain threshold physical vicinity of the virtual desktop device 106. In other embodiments, the proximity of the mobile device 130 is not important and the mobile device may be located anywhere if it is capable of establishing a network connection. In some embodiments, the mobile device 130 may be located on the same subnet as the virtual desktop client device 106. In other embodiments, the devices may be located on different subnets.

In the illustrated embodiment, the mobile device 130 includes a mobile operating system (OS) 132 (e.g. iOS, Android, etc.) and supporting an HTML5 web browser 136. When the user uses the mobile device 130 to scan the QR code displayed on the virtual desktop client device 106, the web browser 136 is launched. The mobile device 130 connects to the web server 120 over the network connection 122 (e.g., WebSocket connection) and runs the web application 138 in the web browser 136 on the mobile device. The web application 138 accesses the digital camera 126, and microphone 128, and transmits the video and audio streams captured by these multimedia accessories to the virtual desktop client device 106 over the Web Socket connection.

The virtual desktop client device 106 receives the video and audio streams and feeds them to the RTAV module 114 in the virtual desktop client application 112 by utilizing the RTAV connector 118. The RTAV module 114 in turn redirects the video and audio streams to the virtual desktop 104. In some embodiments, the RTAV module 114 also receives an audio-out stream from the virtual desktop 104. The audio-out stream is redirected to the mobile device 130 by the web server 120.

RTAV Module

In one embodiment, the RTAV module 114 of the virtual desktop client 112 can be extended to support grabbing multimedia streams from network. To achieve this, certain changes may be made to the module, such as for example:
1. Open Device: TRUE may be returned for success once the TCP connection is established between RTAV module 114 and RTAV connector 118. The RTAV connector 118 may function as a data switcher between the web server 120 and RTAV library.
2. Video in and audio in interface to allow reading data from RTAV connector 118 via socket. One simple implementation is to use a TCP connection between RTAV module 114 and RTAV connector 118.
3. Audio out interface: Since audio-out stream needs to be sent to the mobile device 130, the interface may be modified to be able to transmit data to RTAV connector 118 and then to mobile device 130 via socket. TCP can be used for this as well.

RTAV Connector

RTAV Connector 118 module is a long-lived application. In one embodiment, The RTAV connector 118 is a separate application that is started whenever the virtual desktop client application 112 is loaded. In other embodiments, The RTAV connector 118 can be implemented as a service that is independent from other components on the virtual desktop client device 106.

RTAV connector 118 acts as a central data switcher between RTAV module 114 and the web server 120. In one embodiment, it can be used to simplify the logic of starting a multimedia accessory sharing session. RTAV connector 118 sets up a TCP server, which binds different ports for accepting different connections. RTAV connector 118 is a long-lived application, so the user could connect mobile device 130 to the RTAV connector 118 at any time. The RTAV module 114 in the virtual desktop client application 112 could start a request for video and/or audio data at any time.

Web Server

The web server 120 provides an HTTP or HTTPS service that can be accessed by the mobile device 130. It may be implemented for example, by using Node.js. The web server 120 hosts the web application 138 which runs on mobile device's browser 136. The web server 120 receives the video and audio streams coming from the mobile device 130 and sends them to RTAV connector 118 via a local TCP connection. In one embodiment, the web server 120 also receives an audio-out stream coming from RTAV connector 118 (received from the virtual desktop 104) and sends the audio-out stream to the mobile device 130 via a WebSocket connection established by the web application 138 running on the web browser 136 of the mobile device 130. As such, the web server 120 provides the following services:
1. HTTPS service: The web server 120 provides a basic secured HTTPS service.
2. Web Application 138—The web server 120 hosts the web application 138. The web application 138 captures the video and audio data on the mobile device 130. The web application 138 streams the captured video and audio data to the web server 120 via a WebSocket connection. The web application also handles audio-out playback received from the virtual desktop 104 via the virtual desktop client device 106.
3. Video & Audio Streaming—The web server 120 receives the video and audio data captured by the web application 138 and sends the data to the RTAV connector 118. In order to do this, the web server 120 establishes a TCP connection with the RTAV connector 118. Since the HTTP service is running in the virtual desktop client device 106 as well, it can directly use the local loop address "127.0.0.1". since the two modules are both running on the same device, a TCP connection wan be used without significant impacts on performance.

In the illustrated embodiment, the web server 120 operates on the virtual desktop client device 106 and it started whenever the virtual desktop client application 112 is loaded on the virtual desktop client device 106. In other embodiments, the web server 120 may be operating on a separate device, such as a separate server device accessible over a network connection.

Figure 2:
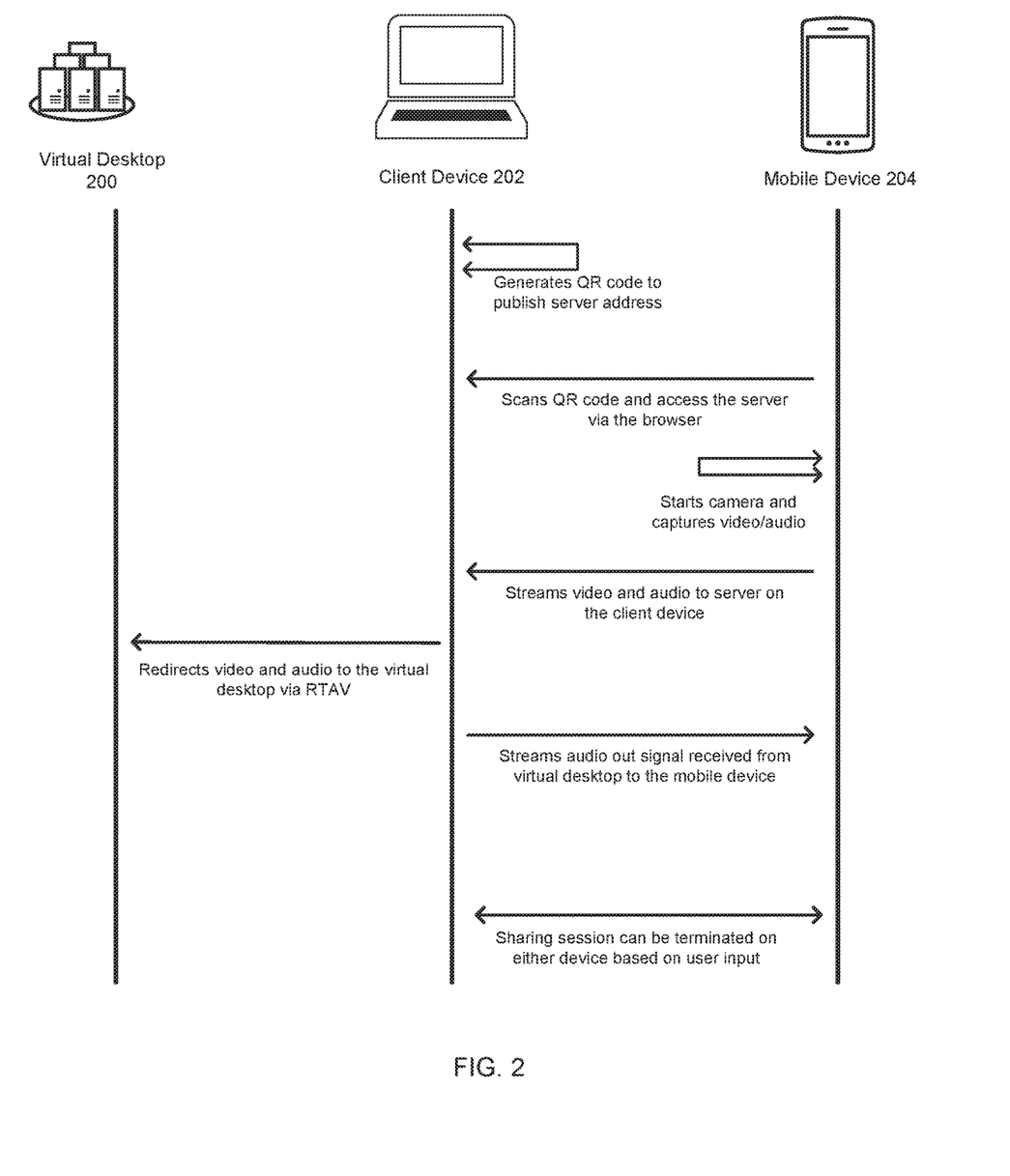
FIG. 2 illustrates an example of the interaction between the virtual desktop, the virtual desktop client device and a mobile device, in accordance with various embodiments.

FIG. 2 illustrates an example of the interaction between the virtual desktop, the virtual desktop client device and a mobile device, in accordance with various embodiments. As shown in the illustration, in response to receiving user input indicating a request to share a multimedia accessory of a nearby mobile device 204, the virtual desktop client device 202 generates a QR code containing the information to identify a web server running on the client device 202 and displays the QR code. The mobile device 204 scans the displayed QR code and accesses the server via a web browser executing on the mobile device. A web application hosted by the server is started on the mobile device 204 and the web application starts the camera and begins capturing the video and audio using the multimedia accessories of the mobile device 204. The web application also begins to stream the captured video and audio to the client device 202. The client device 202 redirects the video and audio stream to the virtual desktop 200 via a RTAV module. In some embodiments, the client device 202 also receives an audio-out signal streamed from the virtual desktop 200 and redirects the received audio-out signal to the mobile device 204. In various embodiments, the multimedia sharing session may be terminated by either the virtual desktop client device 202 or the mobile device 204.

Figure 3:
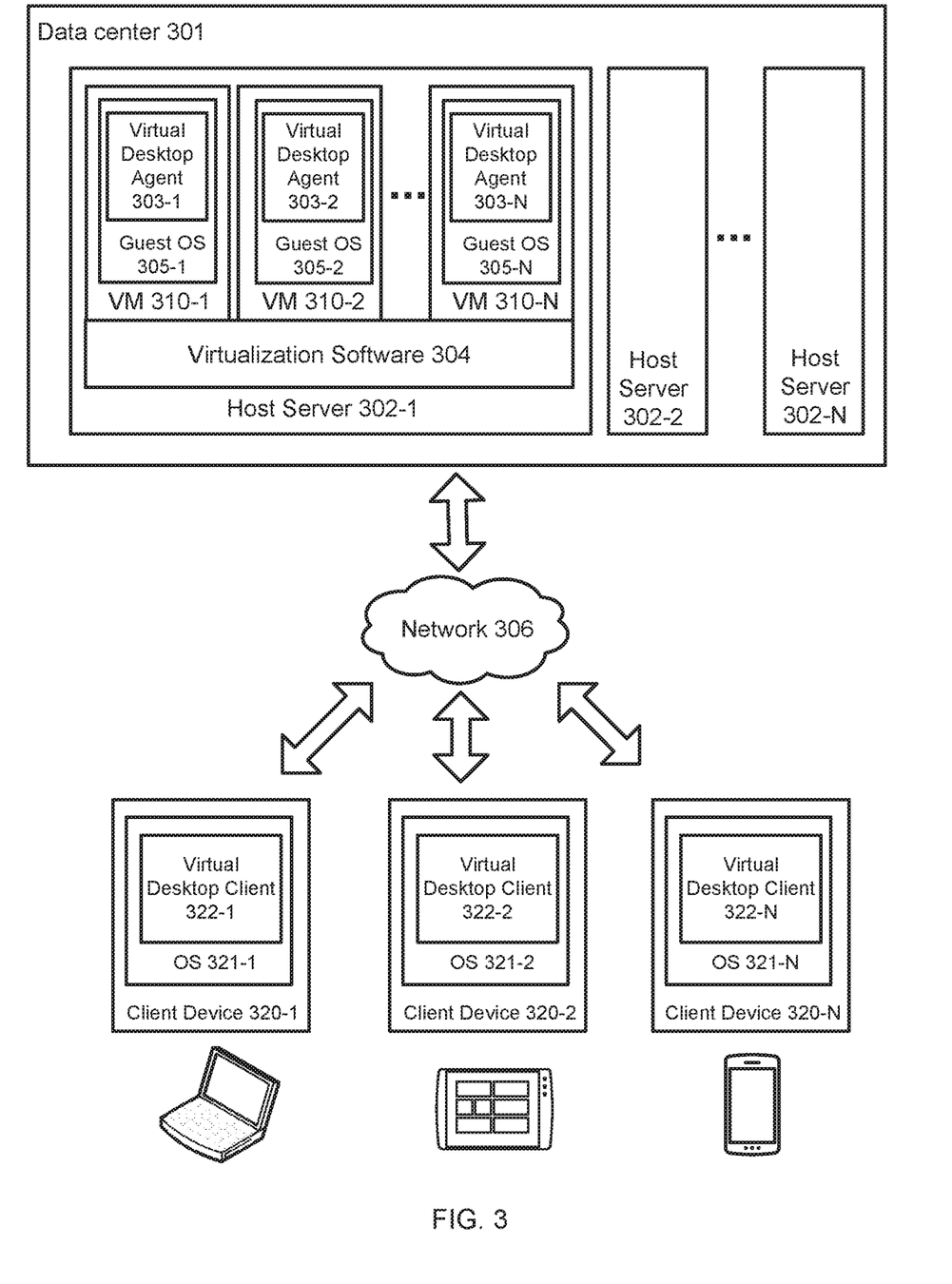
FIG. 3 illustrates an example of a virtual desktop environment in which the virtual desktop can be operating, in accordance with various embodiments.

FIG. 3 illustrates an example of a virtual desktop environment in which the virtual desktop can be operating, in accordance with various embodiments. As used throughout this disclosure, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device even though the desktop is actually executing remotely.

As illustrated in FIG. 3, the virtual desktop environment, such as VDI or DAAS environment, includes host servers (302-1, 302-2, 302-N) that are communicatively coupled with a number of client devices (320-1, 320-2, 320-N) via a network 306. Network 306 may be a wide area network (WAN), or other form of remote communication link between the host servers (302-1, 302-2, 302-N) and client devices (320-1, 320-2, 320-N). Network 306 may further include numerous other components, such as one or more firewalls, connection brokers, management servers, etc., which are not shown here so as not to obscure salient features of the remote desktop environment. Host servers (302-1, 302-2, 302-N) may physically reside in a data center 301 of the enterprise (e.g., in case of VDI) or in a data center of a third-party service provider (e.g., in case of DAAS).

By way of illustration, host server 302-1 can interoperate with client devices (320-1, 320-2, 320-N) to provide virtual desktop services to users of client devices (320-1, 320-2, 320-N). For example, host server 302-1 can host, for each user, a desktop that is presented by a guest operating system (such as one of the guest operating systems 305-1, 305-2, 305-N) running on a virtual machine (such as one of the virtual machines 310-1, 310-2, 310-N) on host server 302-1. In this context, the terms "desktop", "remote desktop", and "virtual desktop" refer to a computing environment in which a user can launch, interact with, and manage the user's applications, settings, and data. Each client device (320-1, 320-2, 320-N) can allow a user to view on a desktop graphical user interface (on a local display device) his/her desktop that is running remotely on host server 302-1, as well as provide commands for controlling the desktop. In this manner, the users of client devices (e.g., 320-1, 320-2, 320-N) can interact with the desktops hosted on host server 302-1 as if the desktops were executing locally on client devices (320-1, 320-2, 320-N).

In the embodiment of FIG. 3, host server 302-1 includes virtualization software 304 that supports the execution of one or more virtual machines (VMs) (e.g., 310-1, 310-2, 310-N). The virtualization software 304 may be a hypervisor, a virtual machine manager (VMM) or other software that allows multiple virtual machines to share the physical resources of the server. In the illustrated embodiment, each virtual machine (e.g., 310-1, 310-2, 310-N) can execute a guest operating system (e.g., 305-1, 305-2, 305-N) that hosts a desktop for a single user at a time. For example, if five users connect to host server 302-1 for the purpose of initiating remote desktop sessions, the host server 302-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 320-1, 320-2, 320-N) can execute a virtual desktop client (e.g., 322-1, 322-2, 322-N). For example, the virtual desktop client (e.g., 322-1, 322-2, 322-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 322-1, 322-2, 322-N) running in the OS (e.g., 321-1, 321-2, 321-N) on the client device (e.g., 320-1, 320-2, 320-N) which communicates with a server-side virtual desktop agent (e.g., 303-1, 303-2, 303-N) that is running on the guest OS inside the virtual machine (e.g., 310-1, 310-2, 310-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 3 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 3, as well as all other figures in this disclosure have been simplified for ease of understanding and are not intended to be exhaustive or limiting to the scope of the invention.

Figure 4:
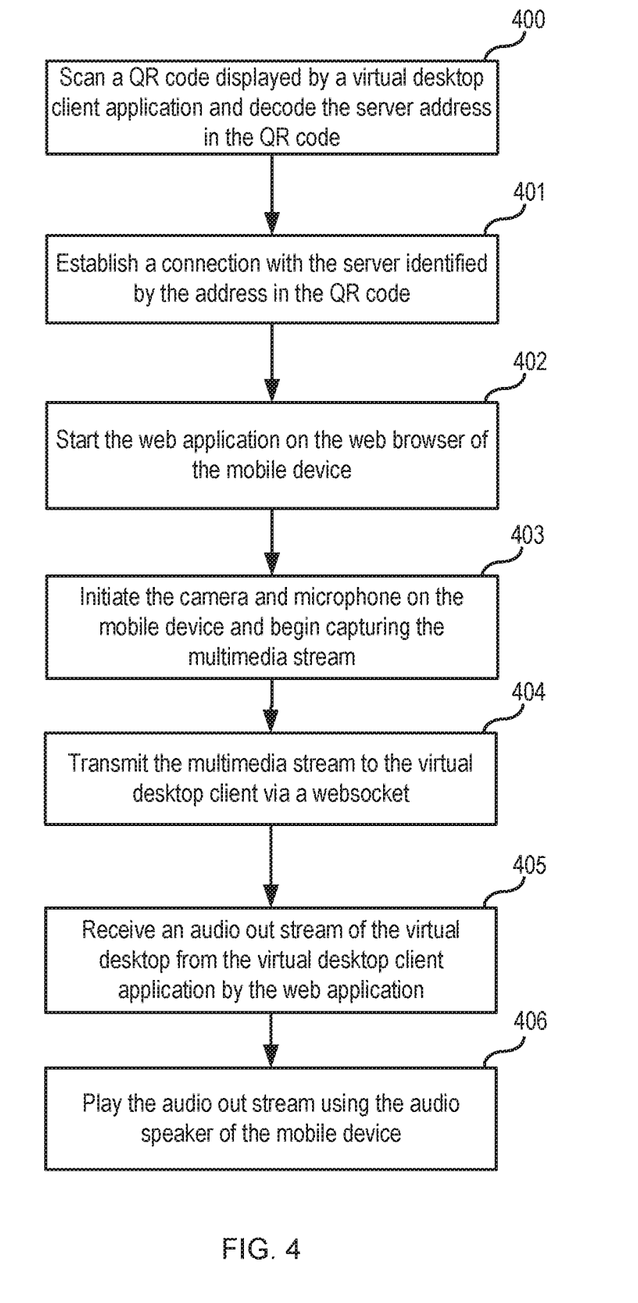
FIG. 4 illustrates an example of a process executed by a mobile device, in accordance with various embodiments.

FIG. 4 illustrates an example of a process executed by a mobile device, in accordance with various embodiments. As shown in operation 400, the mobile device first scans a QR code displayed by the virtual desktop client device. In one embodiment, the QR code is displayed on a computer screen and the QR code is scanned using a QR scanning software operating on the mobile device. In operation 401, when the QR code is scanned, a web browser is launched and the mobile device establishes a connection with the server identified by the information encoded in the QR code. In one embodiment, the connection is a WebSocket connection. In operation 402, a web application is started on the browser of the mobile device. The web application is configured to start capturing the video and audio using the camera and microphone of the mobile device, as shown in operation 403. In operation 404, the captured multimedia stream (i.e. captured video and audio) is transmitted by the mobile device to the virtual desktop client device via the WebSocket connection. In operation 405, the mobile device also receives an audio-out stream of the virtual desktop redirected by the virtual desktop client device. In operation 406, the mobile device plays back the audio-out stream using a local speaker of the mobile device.

Figure 5:
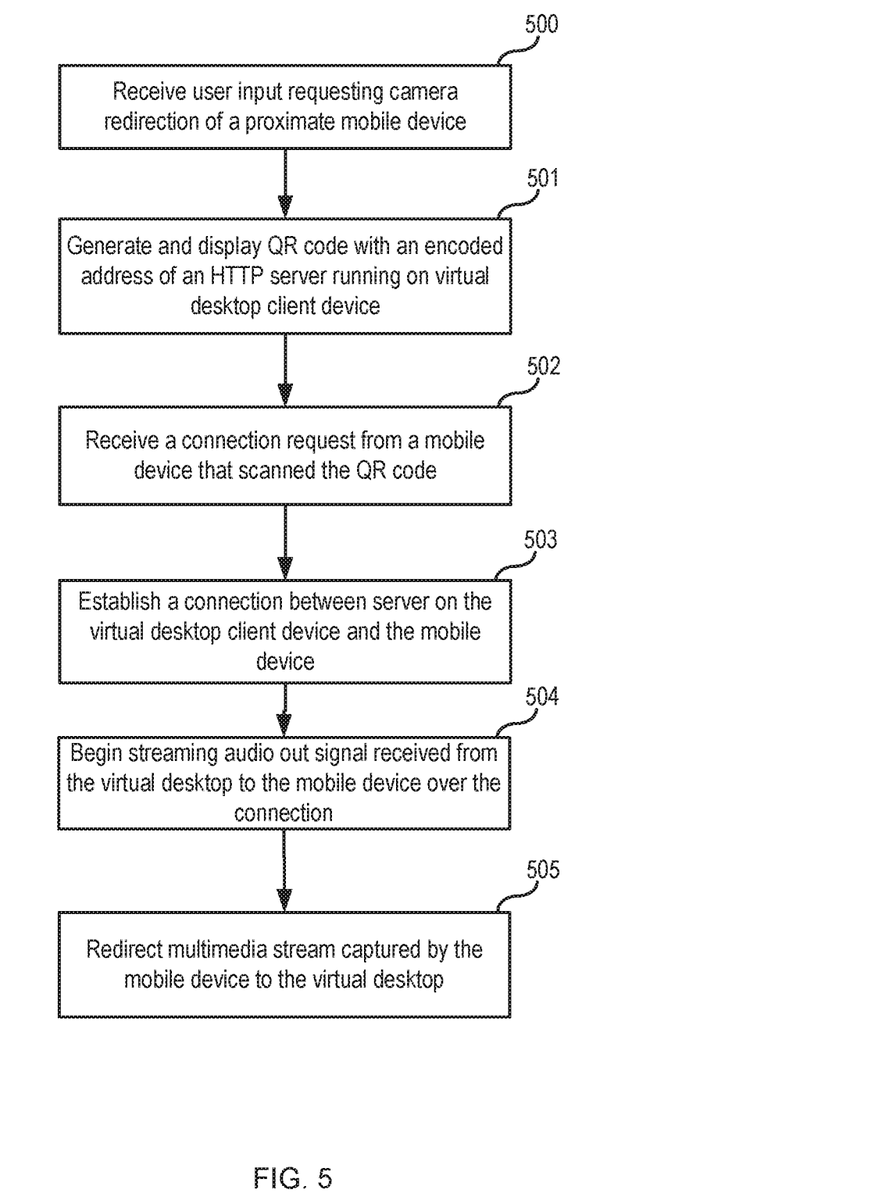
FIG. 5 illustrates an example of a process executed by a virtual desktop client device, in accordance with various embodiments.

FIG. 5 illustrates an example of a process executed by a virtual desktop client device, in accordance with various embodiments. As shown in operation 500, the virtual desktop client device receives user input indicating a request to share a multimedia accessory of a proximate mobile device. In operation 501, the virtual desktop client device generates a QR code with encoded information identifying an HTTP server running on the virtual desktop client device. In operation 502, the HTTP server running on the virtual desktop client device receives a connection request from the mobile device that has scanned the QR code. In operation 503, a connection (e.g. WebSocket connection) is established between the server on the virtual desktop client device and the mobile device. For example, a web application hosted by the server is executed on the web browser of the mobile device. In operation 504, the virtual desktop client device begins to stream an audio-out signal received from the virtual desktop to the mobile device using the established connection. In operation 505, the virtual desktop client also begins to receive video and audio captured on the mobile device and redirects the video and audio captured on the mobile device to the virtual desktop.

Figure 6:
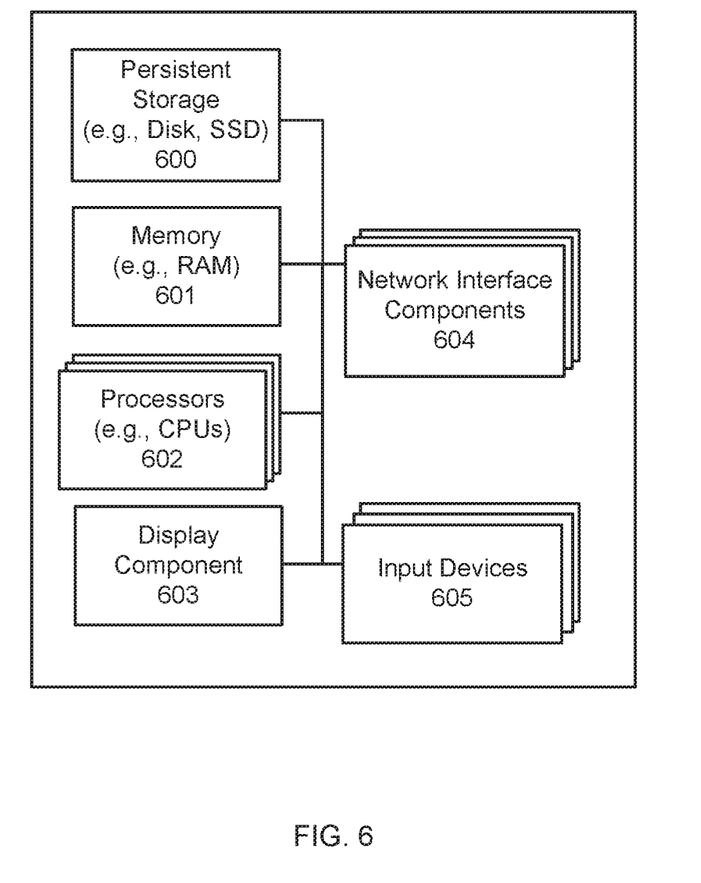
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for redirecting multimedia from a virtual desktop to a proximate mobile device, the method comprising:
    starting a virtual desktop client configured to establish a session with the virtual desktop on a client computer, wherein the virtual desktop sets up a web server used for multimedia redirection on the client computer;
    displaying a QR code by the client computer that is executing the virtual desktop client, the QR code having an identifier of the web server encoded thereon, the web server operating on the client computer;
    receiving a connection request from a mobile device that has scanned the QR code to the web server;
    establishing a network connection between a web browser on the mobile device and the web server operating on the client computer based on the scanned QR code; and
    transmitting a multimedia output stream of the virtual desktop received by the virtual desktop client from the web server on the client computer to the web browser operating on the mobile device over the established network connection.

2. The method of claim 1, further comprising:
    receiving user input indicating a request for multimedia redirection; and
    in response to the request, generating the QR code and displaying the QR code by a QR module in the virtual desktop client.

3. The method of claim 1, wherein the web server is a hypertext transfer protocol (HTTP) server that hosts a web application, wherein the web application is executed on the browser of the mobile device and establishes the network connection, wherein the network connection is a Web Socket connection.

4. The method of claim 1, wherein the virtual desktop client further includes a Real Time Audio Video (RTAV) module configured to receive the multimedia output stream from the virtual desktop and transmit the multimedia output stream to the mobile device.

5. The method of claim 1, further comprising:
    receiving video captured on the mobile device by the virtual desktop client over the established network connection; and
    redirecting the video to the virtual desktop.

6. The method of claim 1, further comprising:
    receiving user input indicating a request to discontinue the transmission; and
    terminating the network connection between the mobile device and the client computer.

7. The method of claim 1, further comprising:
    encoding the Internet Protocol (IP) address of the web server operating on the client computer into the QR code; and
    encoding a one-time use token into the QR code, wherein the one-time use token is configured to expire and become unavailable for future connections after the network connection is established between the mobile device and the web server on the client computer.

8. A computing system, comprising:
    at least one processor; and
    memory including instructions that, when executed by the at least one processor, cause the computing system to perform the operations of:
        starting a virtual desktop client configured to establish a session with the virtual desktop on a client computer, wherein the virtual desktop sets up a web server used for multimedia redirection on the client computer;
        displaying a QR code by the client computer that is executing the virtual desktop client, the QR code having an identifier of the web server encoded thereon, the web server operating on the client computer;
        receiving a connection request from a mobile device that has scanned the QR code to the web server;

establishing a network connection between a web browser on the mobile device and the web server operating on the client computer based on the scanned QR code; and transmitting a multimedia output stream of the virtual desktop received by the virtual desktop client from the web server on the client computer to the web browser operating on the mobile device over the established network connection.

9. The computing system of claim 8, wherein the memory further comprises instructions that, when executed by the at least one processor, cause the computing system to perform the operations of:

receiving user input indicating a request for multimedia redirection; and in response to the request, generating the QR code and displaying the QR code by a QR module in the virtual desktop client.

10. The computing system of claim 8, wherein the web server is a hypertext transfer protocol (HTTP) server that hosts a web application, wherein the web application is executed on the browser of the mobile device and establishes the network connection, wherein the network connection is a Web Socket connection.

11. The computing system of claim 8, wherein the virtual desktop client further includes a Real Time Audio Video (RTAV) module configured to receive the multimedia output stream from the virtual desktop and transmit the multimedia output stream to the mobile device.

12. The computing system of claim 8, wherein the memory further comprises instructions that, when executed by the at least one processor, cause the computing system to perform the operations of:

receiving video captured on the mobile device by the virtual desktop client over the established network connection; and redirecting the video to the virtual desktop.

13. The computing system of claim 8, wherein the memory further comprises instructions that, when executed by the at least one processor, cause the computing system to perform the operations of:

receiving user input indicating a request to discontinue the transmission; and terminating the network connection between the mobile device and the client computer.

14. The computing system of claim 8, wherein the memory further comprises instructions that, when executed by the at least one processor, cause the computing system to perform the operations of:

encoding the Internet Protocol (IP) address of the web server operating on the client computer into the QR code; and encoding a one-time use token into the QR code, wherein the one-time use token is configured to expire and become unavailable for future connections after the network connection is established between the mobile device and the web server on the client computer.

15. A non-transitory computer readable storage medium comprising a set of instructions, the instructions when executed by one or more processors causing the one or more processors to perform the operations of:

starting a virtual desktop client configured to establish a session with the virtual desktop on a client computer, wherein the virtual desktop sets up a web server used for multimedia redirection on the client computer;

displaying a QR code by the client computer that is executing the virtual desktop client, the QR code having an identifier of the web server encoded thereon, the web server operating on the client computer;

receiving a connection request from a mobile device that has scanned the QR code to the web server;

establishing a network connection between a web browser on the mobile device and the web server operating on the client computer based on the scanned QR code; and transmitting a multimedia output stream of the virtual desktop received by the virtual desktop client from the web server on the client computer to the web browser operating on the mobile device over the established network connection.

16. The non-transitory computer readable storage medium of claim 15, further comprising instructions executed by the one or more processors and causing the one or more processors to perform the operations of:

receiving user input indicating a request for multimedia redirection; and in response to the request, generating the QR code and displaying the QR code by a QR module in the virtual desktop client.

17. The non-transitory computer readable storage medium of claim 15, wherein the web server is a hypertext transfer protocol (HTTP) server that hosts a web application, wherein the web application is executed on the browser of the mobile device and establishes the connection, wherein the network connection is a Web Socket connection.

18. The non-transitory computer readable storage medium of claim 15, wherein the virtual desktop client further includes a Real Time Audio Video (RTAV) module configured to receive the multimedia output stream from the virtual desktop and transmit the multimedia output stream to the mobile device.

19. The non-transitory computer readable storage medium of claim 15, further comprising instructions executed by the one or more processors and causing the one or more processors to perform the operations of:

receiving video captured on the mobile device by the virtual desktop client over the established network connection; and redirecting the video to the virtual desktop.

20. The non-transitory computer readable storage medium of claim 15, further comprising instructions executed by the one or more processors and causing the one or more processors to perform the operations of:

encoding the Internet Protocol (IP) address of the web server operating on the client computer into the QR code; and encoding a one-time use token into the QR code, wherein the one-time use token is configured to expire and become unavailable for future connections after the network connection is established between the mobile device and the web server on the client computer.

* * * * *